United States Patent [19]

Satoh et al.

[11] Patent Number: 5,584,428

[45] Date of Patent: Dec. 17, 1996

[54] PROCESS FOR MANUFACTURING CLAD PIPE

[75] Inventors: Atsushi Satoh, Amagasaki; Hiroshi Okamoto, Minoo; Kunihiro Fukui, Kawanishi; Jun-ichi Uchida, Ashiya; Kazuhiro Ogawa, Nishinomiya; Takao Taka, Ikoma; Munekatsu Furugen, Nishinomiya; Masanari Kimoto, Kobe, all of Japan

[73] Assignee: Sumitomo Metal Industries, Ltd., Osaka, Japan

[21] Appl. No.: 385,543

[22] Filed: Feb. 8, 1995

[30] Foreign Application Priority Data

Feb. 8, 1994 [JP] Japan ................................ 6-036564
Apr. 21, 1994 [JP] Japan ................................ 6-082812

[51] Int. Cl.$^6$ ................................................ B23K 20/00
[52] U.S. Cl. ...................... 228/194; 228/132; 228/233.2; 138/142
[58] Field of Search .............................. 228/127, 131, 228/132, 194, 208, 233.2, 234.1; 138/141, 142

[56] References Cited

U.S. PATENT DOCUMENTS 4,869,422  9/1989  Turner ............................. 228/186
5,371,945  12/1994  Schmoor ......................... 29/890.039

FOREIGN PATENT DOCUMENTS

3039428A1   5/1982   Germany.
4105701A1   9/1991   Germany.
54-121239   9/1979   Japan.
59-136494   8/1984   Japan.
59-159284   9/1984   Japan.
62-78783    4/1987   Japan.
62-72423    4/1987   Japan.
1-197081    8/1989   Japan.
2141645     1/1985   United Kingdom.

*Primary Examiner*—Samuel M. Heinrich
*Attorney, Agent, or Firm*—Burns, Doane, Swecker & Mathis, L.L.P.

[57] ABSTRACT

Clad pipe having an inner pipe and an outer pipe metallurgically bonded to each other is manufactured by a process comprising the steps of: (a) preparing an inner pipe and an outer pipe made of different metallic materials, the outer pipe having an inner diameter larger than the outer diameter of the inner pipe; (b) forming an Ni-B layer by electroplating or electroless plating on the surface of one of the pipes facing the other pipe when the two pipes are assembled, the Ni-B layer having a thickness of 2–100 μm and consisting essentially, on a weight basis, of B: 0.5%–7%, Fe: 0%–30%, P: 0%–7%, and a balance of Ni and inevitable impurities; (c) assembling the two pipes by inserting the inner pipe into the outer pipe; (d) subjecting the assembled pipes to cold working for reduction in diameter to such a degree that the outer diameter of the inner pipe is reduced by from 0.5% to 10% to form raw clad pipe in which the inner and outer pipes are in contact; and (e) subjecting the raw clad pipe to heat treatment in the temperature range of 1050°–1250° C. for a time sufficient to metallurgically bond the inner and outer pipes by diffusion bonding.

24 Claims, 2 Drawing Sheets

INNER PIPE

OUTER PIPE

PROCESS FOR MANUFACTURING CLAD PIPE

BACKGROUND OF THE INVENTION

The present invention relates to a process for manufacturing clad pipe which consists of two layers, i.e., an inner pipe and an outer pipe, made of dissimilar metallic materials and metallurgically bonded to each other, the clad pipe being suitable for use in oil and gas wells, pipelines, and chemical plants.

Clad pipe can be designed such that the inner and outer pipes of which it is formed perform different functions and enable the clad pipe as a whole to exhibit the desired properties. For example, in clad pipe having an inner pipe of an Ni-base alloy and an outer pipe of steel, corrosion resistance is provided by the inner pipe while strength is mainly guaranteed by the outer pipe. Such clad pipe is used in oil and gas wells and chemical plants, where corrosion resistance of the interior surface is of great importance.

Clad pipe is generally manufactured by inserting an inner pipe into an outer pipe and subjecting the telescoped two pipes together to hot working such as hot rolling or hot extrusion. During the hot working, the two pipes are reduced in diameter to urge the outer pipe in contact with the inner pipe, and thereafter they are metallurgically bonded by thermal diffusion, i.e., by diffusion bonding under action of the heat applied by hot working.

In order to ensure that the two pipes are metallurgically bonded with good adhesion by diffusion bonding, it is necessary to pretreat the two pipes so as to make the surfaces to be bonded clean and smooth and protect them from oxidation. For this purpose, after the outside surface of the inner pipe and the inside surface of the outer pipe are polished and washed thoroughly, the two pipes are telescoped together (by inserting the inner pipe into the outer pipe) and the space between the two pipes is sealed by seal welding at each end such that the space can be freed of oxygen by evacuating the space. This process is complicated and greatly increases the manufacturing costs of clad pipe.

As a less expensive process for manufacturing clad pipe in which the above-described evacuation step is eliminated, it is known to interpose a low-melting insert between the inner and outer pipes so as to facilitate diffusion bonding.

Japanese Patent Application Laid-Open No. 59-159284 (1984) describes a process in which an inner pipe made of a metallic material having a relatively high coefficient of thermal expansion is fitted into an outer pipe with an Ni foil or an Ni-P plated layer interposed between the two pipes as an insert. The assembled two pipes are heated to join them by the thermal stress caused by expansion of the inner pipe.

In the process described in Japanese Patent Applications Laid-Open Nos. 62-78783 (1987) and 62-72423 (1987), a tape of Ni foil having a phosphorus coating plated on each surface thereof is spirally wound around an inner pipe to form an insert. The inner pipe is then inserted into an outer pipe, and the assembled two pipes are bonded either by subjecting them to cold working for reduction in diameter followed by heat treatment for thermal diffusion, or by subjecting them to hot working.

Japanese Patent Application Laid-Open No. 1-197081 (1989) describes a process in which a layer of a low-melting Ni-base alloy containing Si and B is formed by thermal spraying and is used as an insert.

The above-described known processes using an insert have the following disadvantages.

(1) In the process where diffusion bonding of assembled inner and outer pipes is performed by hot working, the hot working causes a corrosion-resistant alloy such as an Ni-base alloy, which is often used to form the inner pipe, to crack. In addition, the difference in deformation resistance between the inner and outer pipes made of different materials interferes with smooth hot working.

(2) In the process where a tape of a metallic foil is spirally wound around an inner pipe to form an insert, air remains between overlapped layers of the wound tape to form many air pockets, which result in the formation of voids in the bonded area between the two pipes even when they are bonded by cold working followed by heat treatment for thermal diffusion. In order to remove these voids, it is necessary to perform cold drawing, for example, as an additional step, which adds to the manufacturing costs.

(3) In the process where an Ni-P plated layer is used as an insert, an Ni-P eutectic is formed in the bonded area, thereby decreasing the bonding strength and deteriorating the reliability of the process.

(4) The process where an insert is formed by thermal spraying involves the same problem as described in (2) above, since the sprayed layer contains many voids.

SUMMARY OF THE INVENTION

It is an object of the present invention to provide a process for manufacturing clad pipe in which the above-described problems are eliminated.

Another object of the present invention is to provide a process for manufacturing clad pipe in which an inner and an outer pipe are bonded with good adhesion in an industrially feasible, relatively inexpensive manner.

The present invention provides a process for manufacturing clad pipe having an inner pipe and an outer pipe metallurgically bonded to each other, comprising the steps of:

(a) preparing an inner pipe and an outer pipe made of different metallic materials, the outer pipe having an inner diameter larger than the outer diameter of the inner pipe;

(b) forming an Ni-B layer by plating on the surface of one of the pipes facing the other pipe when the two pipes are assembled, the Ni-B layer having a thickness of 2–100 µm and consisting essentially, on a weight basis, of B: 0.5%–7%, Fe: 0%–30%, P: 0%–7%, and a balance of Ni and inevitable impurities;

(c) assembling the two pipes by inserting the inner pipe into the outer pipe;

(d) subjecting the assembled pipes to cold working for reduction in diameter to such a degree that the outer diameter of the inner pipe is reduced by from 0.5% to 10% to form raw clad pipe in which the inner and outer pipes are in contact; and (e) subjecting the raw clad pipe to heat treatment in the temperature range of 1050°–1250° C. for a time sufficient to metallurgically bond the inner and outer pipes by diffusion bonding.

When the Ni-B layer is substantially free from P, the heat treatment in step (e) is preferably conducted in the temperature range of 1100°–1250° C. When the Ni-B layer contains P, it is preferable that the P content of the layer be in the range of 0.5%–7% by weight.

In a preferred embodiment, the process further comprises the following step (f) between the cold working step (d) and the heat treatment step (e):

(f) heating the raw clad pipe locally to a temperature of 1050°–1250° C. while moving the heated zone continuously at a speed of 0.1–10 mm/sec along the longitudinal axis of the pipe from one end to the other end thereof.

DETAILED DESCRIPTION OF THE INVENTION

Figure 1A:
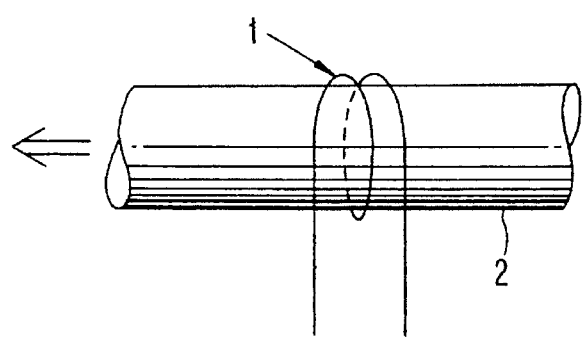
FIG. 1(A) is a schematic illustration showing a method for performing the local heating step (f) while moving the heated zone and FIG. 1(B) is a cross-section of the clad pipe shown in FIG. 1(A)

In the process of the present invention, an inner and an outer pipe made of different metallic materials and assembled telescopically are bonded by diffusion bonding after cold working with a relatively low reduction in diameter, thereby eliminating a hot working step and hence avoiding any damage, caused by hot working, to a pipe made of a corrosion resistant alloy such as an Ni-base alloy, which is normally used as an inner pipe of clad pipe.

In order to prevent the formation of voids in the bonded area, a low-melting Ni-B layer is formed as an insert by plating one of the pipes before assembling, and the assembled pipes are subjected to cold working before diffusion bonding. The Ni-B layer is preferably formed on the pipe the material of which is either unsusceptible to the formation of a passive oxide film or else less susceptible than the material of the other pipe.

The formation of voids can be prevented more effectively when the raw clad pipe formed by the cold working step (d) is locally heated, before the diffusion bonding step (e), while moving the heated zone continuously and unidirectionally along the longitudinal axis of the pipes.

As a result, clad pipe manufactured by a process according to the present invention has good adhesion between the inner and outer pipes and is substantially free from damage such as cracks caused by hot working.

In most cases, the outer pipe is made of a carbon steel, low-alloy steel, or stainless steel, while the inner pipe is made of a stainless steel or corrosion-resistant alloy such as an Ni-base alloy, titanium, Ti-base alloy, or Zr-base alloy. When the pipes are made of such materials, the metallic material of the outer pipe is generally unsusceptible to the formation of a passive film or is less susceptible than that of the inner pipe. It is therefore preferable that the Ni-B insert layer be formed on the inside surface of the outer pipe.

However, depending on the environment of use, the metallic materials for the inner and outer pipes may be reversed, particularly in those cases where the clad pipe is used in a severely corrosive environment. In such cases, the metallic material of the inner pipe is less susceptible to the formation of a passive film than that of the inner pipe, and it is preferable that the Ni-B layer be formed on the outside surface of the inner pipe.

The present invention will now be described more fully. In the following description, all percents are by weight unless otherwise indicated.

Composition of Ni-B layer as an insert

In order to metallurgically bond the inner and outer pipes by diffusion bonding and preferably liquid phase diffusion bonding, an Ni-B layer which may further contain P (phosphorus) and which has a melting temperature low enough to facilitate diffusion bonding is formed as an insert by plating one of the pipes. In diffusion bonding, the melting temperature of an insert is an important factor to obtain satisfactory adhesion by metallic bonds.

The plated Ni-B layer used as an insert contains B (boron) in a proportion of 0.5%–7% and optionally up to 30% of Fe and up to 7% of P. Such an Ni-B layer has a melting temperature in the range of 1100°–1250° C. when it is substantially free from P.

If the B content is less than 0.5%, the melting temperature of the Ni-B layer may exceed 1250° C., the highest temperature employed in the heat treatment for diffusion bonding, and it adversely affects the adhesion attained by diffusion bonding. A boron content of greater than 7% is disadvantageous since it takes a prolonged time to form an Ni-B layer having such a boron content by plating. The B content is preferably in the range of 1%–4%.

The Ni-B layer may optionally contain P, since the addition of P has an effect of further decreasing the melting temperature of the Ni-B layer. This effect is not appreciable when the P content is less than 0.5%. The addition of more than 7% P causes the bonded area formed by diffusion bonding to become brittle. Therefore, when P is present in the Ni-B layer, it is preferable that the P content be in the range of 0.5% to 7%. The addition of P in this range serves to lower the melting temperature of the Ni-B layer by a maximum of about 50° C. such that the lowest melting temperature of the resulting Ni-B-P layer becomes 1050° C. A more preferable P content is 1%–4%.

In some plating methods for the formation of an Ni-B layer, part of Fe present in the metallic material of the pipe to be plated may dissolve and be incorporated into the resulting plated layer. The incorporation of Fe causes the plated Ni-B layer to have an increased melting temperature. Fe may be present in the plated layer in a proportion of up to 30% since the presence of up to this amount of Fe does not significantly increase the melting temperature of the plated layer. Preferably, the Ni-B layer has an Fe content of up to 20%. The Ni-B layer may, of course, be substantially free from Fe.

Thickness of insert

The Ni-B plated layer as an insert has a thickness between 2 and 100 μm and preferably 5 to 50 μm. An Ni-B layer thinner than 2 μm cannot sufficiently fill up the fine recesses present in the metallic surface to be bonded and therefore it is difficult for the layer to achieve its function as an insert, which melts to facilitate the formation of metallic bonds between the two pipes during the subsequent heat treatment step. An Ni-B layer thicker than 100 μm is disadvantageous from an economic viewpoint since no further improvement in effect is obtained and it takes a prolonged time to form such a thick plated layer.

Surface to be plated with an Ni-B layer

Microscopic voids present at the interface between the plated layer and the substrate metal pipe frequently remain in the bonded area after diffusion bonding and greatly deteriorate the bonding strength of the resulting clad pipe.

The formation of such voids during plating is mostly attributable to the oxide film formed on the surface of the metal pipe to be plated. Particularly, Cr-rich metals, e.g., steels and alloys containing 12% or more Cr, as is the case with most stainless steels and Ni-base alloys, are susceptible to the formation of a passive oxide film on the surface thereof. If a pipe made of such a steel or alloy is plated with an Ni-B layer, many voids tend to form at the interface between the pipe and the plated layer and cause a significant decrease in the adhesion after diffusion bonding.

Accordingly, it is preferable that the Ni-B layer as an insert be formed on the pipe the material of which is less susceptible to the formation of a passive oxide film than the material of the other pipe or unsusceptible to the formation of such a film. Of course, such a layer is formed on the surface of the selected pipe facing the other pipe, i.e., either on the inside surface of the outer pipe or on the outside surface of the inner pipe.

Plating method

The Ni-B layer may be formed by any known plating method which can be applied employed with pipes. The plating technique may be either electroplating or electroless (chemical) plating.

Electroplating of a pipe may be performed, for example, by the method described in Japanese Patent Application Laid-Open No. 54-121239 (1979) or 59-136494 (1984). However, most conventional electroplating methods for pipes are intended for interior plating of a pipe and cannot be used for exterior plating. Moreover, some conventional methods are disadvantageous in that the pipe must be placed vertically or diagonally during plating, thereby making the methods difficult to employ with a very long or heavy pipe. In other methods where the pipe is supported horizontally during plating, it is difficult to allow the gas evolved by the electrolytic reaction to escape quickly, thereby resulting in the formation of uncovered bare spots and marks of bubbles in the plated coating. Furthermore, the thickness of the plated coating is not uniform and varies, particularly in the circumferential direction at the central zone of the pipe, due to sagging of the pipe or electrode.

The present invention also provides novel electroplating and electroless plating methods for metal pipes, the methods being capable of both interior and exterior plating without the above-described disadvantages.

A first electroplating method, which is applicable to interior plating of an outer pipe, comprises inserting a round bar- or pipe-shaped internal electrode concentrically into a horizontally-supported metal pipe to be plated so as to leave an annular space between the metal pipe and the inserted internal electrode, the annular space extending along the entire length of the metal pipe, and performing electroplating of the inside surface of the metal pipe by passing an electric current between the metal pipe, functioning as a cathode, and the internal electrode, functioning as an anode, while a plating solution is forced to flow in the annular space unidirectionally from one end to the other end thereof and while the metal pipe is rotated about its axis.

A second electroplating method, which is applicable to exterior plating of an inner pipe, comprises placing a round pipe-shaped external electrode so as to concentrically surround a horizontally-supported metal pipe to be plated and leave an annular space between the metal pipe and the surrounding external electrode, the annular space extending along the entire length of the metal pipe, and performing electroplating of the outside surface of the metal pipe by passing an electric current between the metal pipe, functioning as a cathode, and the external electrode, functioning as an anode, while a plating solution is forced to flow in the annular space unidirectionally from one end to the other end thereof and while the metal pipe is rotated about its axis.

The interior plating of a metal pipe according to the above-described first electroplating method can be performed by using a first electroplating apparatus which comprises:

a round bar- or pipe-shaped internal electrode inserted into a metal pipe to be plated so as to leave an annular space extending along the entire length of the metal pipe between the metal pipe and the inserted internal electrode, a pair of sealing lids secured to the opposite ends of the internal electrode, the sealing lids supporting the internal electrode concentrically with respect to the surrounding metal pipe and sealing the annular space between the metal pipe and the internal electrode, a rotating mechanism for supporting the metal pipe horizontally and rotating the pipe about its axis along with the internal electrode inserted therein, a power source for applying a potential between the internal electrode and metal pipe in such a manner that the metal pipe functions as a cathode and the electrode functions as an anode, and a fluid-feeding means for creating a forced unidirectional flow of a fluid, such as a plating solution, in the annular space from one end to the other end thereof through the sealing lids.

The exterior plating of a metal pipe according to the above-described second electroplating method can be performed by using a second electroplating apparatus which comprises:

a round pipe-shaped external electrode surrounding a metal pipe to be plated so as to leave an annular space extending along the entire length of the metal pipe between the metal pipe and the surrounding external electrode, a pair of sealing lids secured to the opposite ends of the external electrode, the sealing lids supporting the metal pipe concentrically with respect to the surrounding external electrode and sealing the annular space between the metal pipe and the external electrode, a rotating mechanism for supporting the external electrode horizontally and rotating the electrode about its axis along with the metal pipe placed therein, a power source for applying a potential between the external electrode and metal pipe in such a manner that the metal pipe functions as a cathode and the electrode functions as an anode, and a fluid-feeding means for creating a forced unidirectional flow of a fluid, such as a plating solution, in the annular space from one end to the other end thereof through the sealing lids.

These apparatuses can be used to perform not only electroplating but also various procedures involved in electroplating such as degreasing, pickling, or rinsing with water by changing the fluid which is continuously fed into the annular space and forced to flow in one direction.

In the first electroplating method and apparatus, the horizontally-supported metal pipe, into which the internal electrode is placed concentrically, is used as a plating cell to perform interior plating of the pipe. In the second electroplating method and apparatus, the horizontally-supported pipe-shaped external electrode, into which the metal pipe is placed concentrically, is used as a plating cell to perform exterior plating of the pipe.

In each of these electroplating methods and apparatuses, the annular space between the metal pipe and the inner or external electrode serves as an electrolytic chamber, in which a plating solution or other fluid such as a degreasing solution, pickling solution, or rinse water is forced to flow from one end to the other end during the desired operation. As a result, gas evolved by the electrolytic reaction or other reaction is quickly discharged out of the electrolytic chamber. A small amount of the gas remains, but the residual gas is prevented from localization along the longitudinal axis of the metal pipe. In addition, circumferential rotation of the metal pipe, i.e., rotation of the pipe about its axis during the operation also prevents localization of the residual gas in the circumferential direction and uneven deposition of the plated coating in that direction. Accordingly, even though the metal pipe is processed in a horizontal position, a uniform and high-quality plated coating is formed on the inner or outer surface of the metal pipe.

The plating solution useful in electroplating with an Ni-B layer contains one or more sources for each of Ni, B, and optionally P. Suitable nickel sources are nickel salts such as sulfates, chlorides, phosphates, and nitrates. Boron compounds useful as boron sources are boric acids, organic boron compounds such as amine boranes [e.g., dimethylamine borane, $(CH_3)_2HN.BH_3$, and trimethylamine borane, $(CH_3)_3N.BH_3$]. Suitable phosphorus sources are phosphoric acid and other phosphorus-containing acids.

When the Ni-B layer is formed by electroless plating, it is also preferable to perform the electroless plating with the metal pipe to be plated in a horizontal position while the pipe is rotated about its axis. However, in the case of electroless plating, it is not necessary for a plating solution to be forced to flow from one end to the other end of the pipe. The plating manner and apparatuses for electroless plating may generally be the same as described above with respect to electroplating, although no electric current is, of course, passed during plating and the internal electrode may be eliminated in interior plating. The external electrode is necessary as a cover pipe retaining the plating solution around the metal pipe.

Thus, a first electroless plating method, which is applicable to interior plating of an outer pipe, comprises performing electroless plating of the inside surface of a horizontally-positioned metal pipe while the metal pipe is rotated about its axis.

A second electroless plating method, which is applicable to exterior plating of an inner pipe, comprises inserting a metal pipe concentrically into a horizontally-supported cover pipe so as to leave an annular space between the metal pipe and the surrounding cover pipe, the annular space extending the entire length of the metal pipe, and performing electroless plating of the outside surface of the metal pipe while the metal pipe is rotated about its axis.

Also in these electroless plating methods, the cylindrical or annular space inside the metal pipe in the first interior plating method or the annular space in the second exterior plating method serves as a plating chamber through which not only a plating solution but also various fluids such as a degreasing solution and a pickling solution and rinse water can be passed separately.

The plating solution useful in electroless plating with an Ni-B layer contains a nickel salt such as nickel sulfate, a boron-containing reducing agent, and a complexing agent. When it is desired to form an Ni-B layer which further contains P, a phosphorus-containing reducing agent is added to the plating solution along with the boron-containing reducing agent.

Useful boron-containing reducing agents include sodium boron hydride ($NaBH_4$), and organic amine boranes such as dimethylamine borane [$(CH_3)_2HN.BH_3$], diethylamine borane [$(C_2H_5)_2HN.BH_3$], pyridine borane ($C_5H_5N.BH_3$), and t-butylamine borane [$(CH_3)_3CNH_2.BH_3$]. Useful phosphorus-containing reducing agents include hypophosphorous acid and its alkali metal salts. These reducing agents serve to reduce the nickel salt into nickel metal and at the same time to co-precipitate boron or phosphorus in the plated nickel layer. Useful complexing agents include hydroxycarboxylic acids, monocarboxylic acids, and aminocarboxylic acids.

The plating solution used in electroless plating preferably contains a nickel salt, boron-containing reducing agent, and complexing agent each in a concentration of 1–20 g/l. The concentration of the nickel salt is more preferably in the range of 3–10 g/l. When a phosphorus-containing reducing agent as added, the total concentration of the boron- and phosphorus-containing reducing agents is preferably in the range of 1–20 g/l. The electroless plating are preferably performed at a temperature of 30°–80° C. and a pH of 4.0–7.0.

Cold working for reduction in diameter

The inner and outer pipes, one of which has an Ni-B plated layer as an insert on the surface facing the other pipe, are assembled by inserting the inner pipe into the outer pipe. The assembled pipes are subjected to cold working for reduction in diameter (reducing) in order to remove the air layer present between the assembled two pipes and form a raw clad pipe in which the two pipes are in contact by mechanically urging the outer pipe against the inner pipe by the reducing action applied.

The cold working is performed to such a degree that the outer diameter of the inner pipe is reduced by from 0.5% to 10% and preferably from 2% to 10%. If this reduction ratio is less than 0.5%, cold working is not effective for producing tight contact of the two pipes and removal of the air layer. If it is more than 10%, one or both of the pipes may be buckled or partly broken and subsequent heating or heat treatment may cause a significant deformation of the clad pipe.

The cold working of the assembled pipes may be carried out either by drawing through a die or rolling (reducing) through a reducing mill.

Temperature for diffusion bonding

The cold-worked assembled pipes, i.e., raw clad pipe, is subjected to heat treatment to bond the two pipes by thermal diffusion (diffusion bonding) and produce the desired metallurgically bonded clad pipe. The heat treatment is performed in the temperature range of 1100°–1250° C. and preferably 1150°–1250° C. when the insert is an Ni-B layer which is substantially free from P, or in the temperature range of 1050°–1250° C. and preferably 1100°–1250° C. when the insert is an Ni-B layer containing 0.5-7% P.

It is not always necessary that the temperature for heat treatment be equal to or higher than the melting temperature of the Ni-B layer in the above range, since sufficient diffusion for bonding may take place by heat treatment at a temperature at which the Ni-B insert is not completely liquefied and a solid and liquid phases coexist. However, when the heat treatment temperature is below 1100° C. with an insert of a P-free plated Ni-B layer or below 1050° C. with an insert of a P-containing plated Ni-B layer, diffusion of metal atoms does not occur to a degree sufficient to adequately form the desired metallic bonds between the two pipes. Heat treatment at a temperature above 1250° C.

significantly coarsens the grains of the metallic materials constituting the inner and outer pipes, thereby embrittling the resulting clad pipe and deteriorating the corrosion resistance thereof.

Manufacturing process

In order to ensure that an inner and an outer pipe are bonded by thermal diffusion with good adhesion, an Ni-B layer is formed as an insert by plating on the surface of one pipe facing the other pipe before assembling the two pipes. The Ni-B layer is preferably formed on the pipe of a material which is less susceptible to the formation of a passive oxide film than the material of the other pipe or which is unsusceptible to the formation of such a film.

The two pipes having the plated Ni-B layer as an insert on one pipe are then assembled by inserting the inner pipe into the outer pipe, and the assembled pipes are subjected to cold working in the above-described manner to form raw clad pipe in which the two pipes are in contact. Thereafter, the raw clad pipe is subjected to heat treatment in the above-described temperature range for a time sufficient to metallurgically bond the inner and outer pipes by thermal diffusion. The duration of heat treatment required for diffusion bonding depends on the temperature and the composition and thickness of the Ni-B layer as an insert and is usually in the range of 5 to 90 minutes.

In a preferred embodiment, subsequent to the cold working step and before the heat treatment step for diffusion bonding, the raw clad pipe is subjected to local heating to a temperature of 1050°–1250° C. while the heated zone is continuously moved at a speed of 0.1–10 mm/sec along the longitudinal axis of the pipe from one end to the other end thereof, in order to remove the residual air more effectively.

Figure 1B:
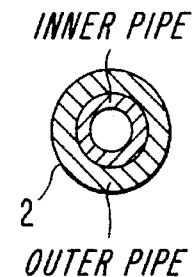

FIG. 1(A) is a schematic illustration showing a method for performing the local heating step and FIG. 1(B) shows a cross-section of the clad pipe shown in FIG. 1(A). An induction heating coil 1 is used to locally heat raw clad pipe 2 formed by cold working, which is inserted into the heating coil 1. Either the induction heating coil 1 or the raw clad pipe 2 is moved in the direction of the arrow, i.e., in the longitudinal direction, so as to continuously move the heated zone along the longitudinal axis of the pipe from one end to the other end thereof. By such a unidirectional movement of the heated zone along the entire length of the pipe, any air remaining between the insert and one of the inner and outer pipes can be driven off in the same direction as the moving direction of the heated zone, thereby making it possible to prevent the formation of voids during the subsequent heat treatment step for diffusion bonding.

If the temperature to which the pipe is locally heated is below 1050° C. or the heated zone is moved at a speed greater than 10 mm/sec, the desired removal of remaining air cannot be achieved sufficiently. Heating to a temperature above 1250° C. may cause the same adverse effects as described with respect to heat treatment for diffusion bonding. A moving speed of the heated zone of less than 0.1 mm/sec undesirably decreases the manufacturing efficiency of the process without further improvement in the effect on removal of remaining air.

The width of the heated zone can be selected depending on the outer diameter and wall thickness of the raw clad pipe and is preferably in the range of about 20 mm to 30 mm.

Embodiments of Plating methods and apparatuses

Figure 2:
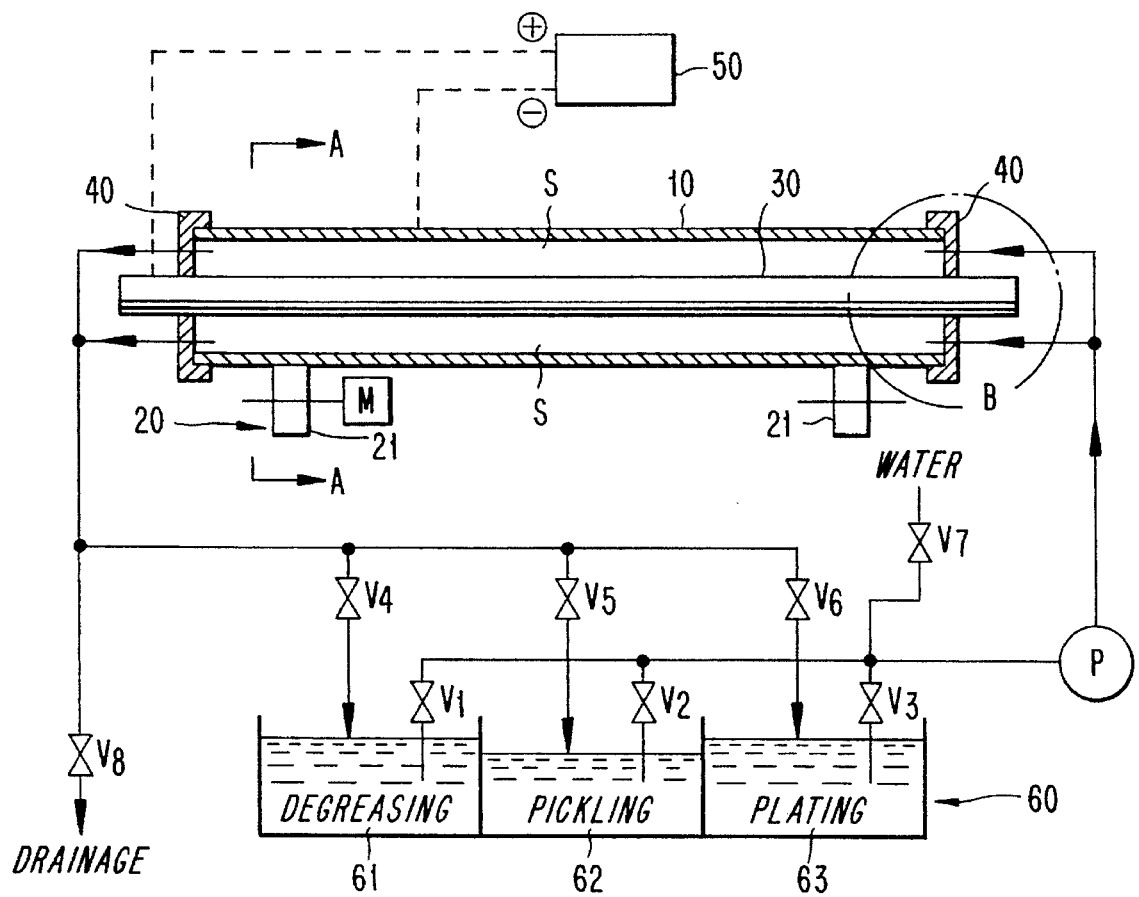
FIG. 2 is a schematic diagram showing an electroplating apparatus which can be used in the process of the present invention.
Figure 3A:
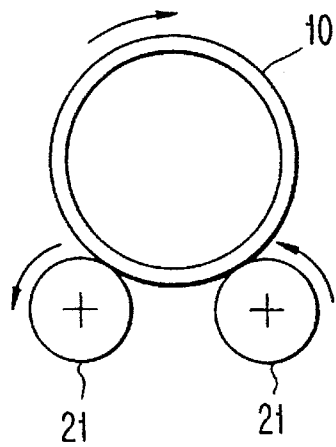
FIG. 3(A) is an enlarged cross section taken along line A—A in FIG. 2.
Figure 3B:
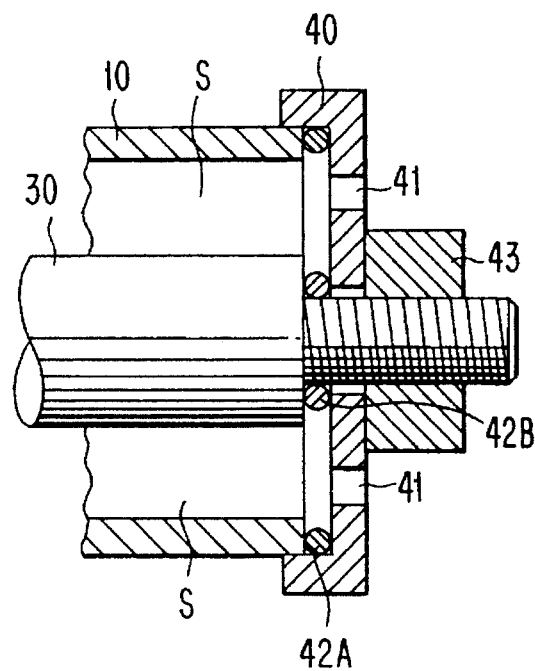
FIG. 3(B) is an enlarged view of the encircled portion B in FIG. 2.

Referring to FIGS. 2 and 3, the above-described first electroplating method and apparatus, which are suitable for interior plating of an outer pipe, will be described.

A metal pipe 10, which serves as an outer pipe to be plated on its inside surface, is mounted in a horizontal position on a rotating mechanism 20. An internal electrode 30 in the shape of a round bar or pipe is inserted into the metal pipe 10 so as to extend along the entire length of the metal pipe. A pair of sealing lids 40, 40 are secured to the opposite ends of the internal electrodes 30 so as to support the internal electrode concentrically (coaxially) with the surrounding metal pipe 10 and sealing an annular space S formed between the metal pipe 10 and the internal electrode 30.

The internal electrode 30 may be comprised entirely of a conductive material serving as a soluble electrode or insoluble electrode. Alternatively, such a conductive material may constitute only an outside surface layer of the internal electrode 30.

As shown in FIG. 2(B), each sealing lid 40, which is made of an insulating material such as a synthetic resin, is secured to the end of the internal electrode 30 by a nut 43. Each sealing lid has one or more openings communicating with the annular space S in order to create a unidirectional flow of a fluid in the annular space from one end to the other end thereof. Sealing rings 42A, 42B are fitted between the sealing lid 40 and the metal pipe 10 and between the sealing lid 40 and the internal electrode 30, respectively.

The rotating mechanism 20 comprises a plurality of rollers 21, 21 spaced in the longitudinal direction of the metal pipe 10 so as to support the metal pipe horizontally. The rollers 21, 21 are driven synchronously by a motor M so as to rotate the metal pipe 10 about its axis along with the internal electrode 30 placed therein.

A power source 50 is connected to the metal pipe 10 and internal electrode 30 such that the metal pipe is a cathode and the internal electrode is an anode. The openings 41 in the sealing lids 40 are each connected to a fluid-feeding means 60 through a flexible hose. The fluid-feeding means comprises tanks 61, 62, and 63 for a degreasing solution, pickling solution, and plating solution, respectively, as well as a water inlet, pump, and various valves $V_1$ to $V_8$. Using these valves, it is possible to change the fluid that is forced to flow in the annular space S between the metal pipe 10 and the internal electrode 30. Namely, the solutions in tanks 61, 62, and 63 and rinse water can be passed through the annular space S separately to perform degreasing, pickling, plating, and water rinsing, respectively, as described below.

First, the degreasing solution in tank 61 is forced to flow through the annular space S so as to create a circulating, unidirectional flow of the solution from one end to the other end of the annular space while an electric current is passed, thereby electrolytically degreasing the inside surface of the metal pipe 10. If desired, degreasing may be performed without passing an electric current. The rotating mechanism 20 is activated so as to rotate the metal pipe along with the inserted internal electrode 30 during electrolytic degreasing.

Subsequently, water is forced to flow unidirectionally through the annular space S to rinse the inside surface of the metal pipe. Likewise, the pickling solution in tank 62 and water are forced to flow successively to perform pickling and rinsing of the inside surface of the metal pipe 10. It is preferable to rotate the metal pipe during water rinsing and pickling. Thereafter, the plating solution in tank 63 is forced to flow through the annular space S in a circulating and unidirectional manner while an electric current is passed between the metal pipe (cathode) and the internal electrode (anode), thereby depositing an electroplated layer on the inside surface of the metal pipe. During the electroplating, the metal pipe is rotated about its axis by the rotating mechanism 20. Finally, water is forced to flow in the annular space S to rinse the inside surface of the metal pipe with water.

In the case of electroless interior plating of a metal pipe (outer pipe), the plating apparatus shown in FIG. 2 can be modified such that the internal electrode 30 and power source 50 are eliminated, although both may be maintained in order to perform degreasing electrolytically. The internal electrode may also remain in order to reduce the space inside the metal pipe. The sealing lids may be made of a corrosion-resistant conductive material such as stainless steel, although they are preferably made of a resin.

The electroless plating procedure are conducted generally in the same manner as described above except that an electric current is not made to flow during the plating stage or during the degreasing stage if electrolytic degreasing is not employed and that the plating solution may not be forced to flow unidirectionally.

Figure 4:
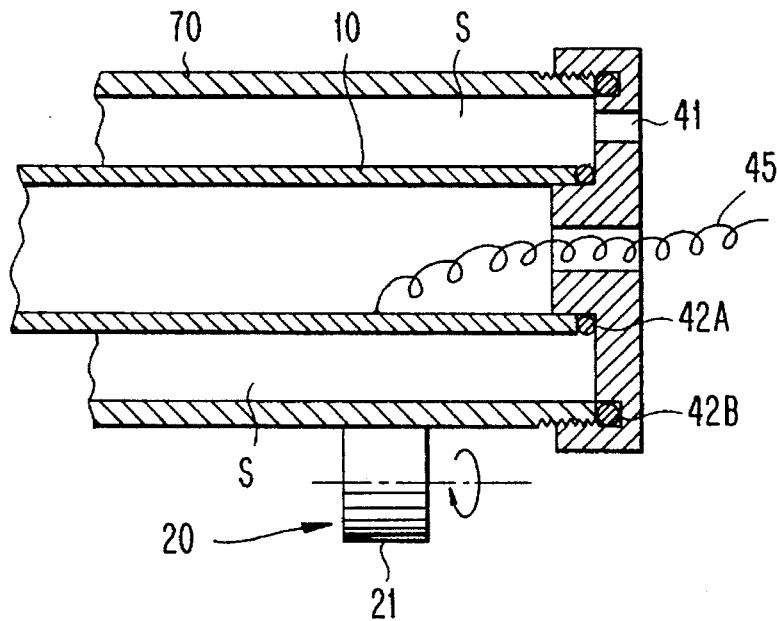
FIG. 4 is a schematic diagram showing another electroplating apparatus which can be used in the process of the present invention.

FIG. 4 shows the above-described second electroplating method and apparatus, which are suitable for exterior plating of an inner pipe. This plating method and apparatus are different from the first plating method and apparatus shown in FIGS. 2 and 3 in that the metal pipe 10 is placed inside and surrounded by a pipe-shaped external electrode 70. The external electrode 70 may extend slightly beyond the opposite ends of the metal pipe 10 such that the total length of the external surface of the metal pipe can be plated. Like the internal electrode, the external electrode 70 may be comprised entirely of a conductive material suitable for an electrode, or only an inside surface layer of the external electrode may be comprised of such a conductive material.

A pair of sealing lids 40, 40 are secured to the opposite ends of the external electrodes 70 by threaded engagement so as to support the metal pipe 10 concentrically with the surrounding external electrode. The sealing lids are made of an insulating material and seal an annular space S between the external electrode 70 and metal pipe 10 through sealing rings 42A and 42B. Each sealing lid 40 has a central opening 43 through which a lead wire 45 is threaded to connect the metal pipe 10 to a power source, and one or more peripheral openings which communicate with the annular space S to create a unidirectional flow of a fluid.

The electroplating procedure for exterior plating using the apparatus shown in FIG. 4 is generally the same as described above with respect to interior plating. Thus, a degreasing solution, rinse water, pickling solution, rinse water, plating solution, and rinse water are successively forced to flow unidirectionally through the annular space S while the external electrode is rotated along with the metal pipe and an electric current is passed between the metal pipe (cathode) and the external electrode (anode) during the plating stage and optionally during the degreasing stage.

The plating apparatus shown in FIG. 4 can be used to perform electroless exterior plating of a metal pipe (inner pipe) without modification, although the external electrode 70 serves as a mere cover pipe to retain a plating solution or other fluid around the metal pipe, and therefore it may be made entirely of an insulating material such as a resin. Electroless exterior plating of an inner pipe may be performed in the same manner as described above with respect to electroless interior plating of an outer pipe.

As described previously, in the case of electroless plating, there is no need to force the plating solution to flow in the plating chamber regardless of interior or exterior plating. However, if desired, the plating solution may be forced to flow in the same manner as for electroplating.

In each plating procedure, switching of the power source, changing the fluid that is passed through the annular space S, and rotation of the metal pipe can be automatically controlled by means of an external program controller.

In the case of electroplating, the plating solution is preferably forced to flow at a rate of at least 0.5×V and more preferably at least 1.0×V per minute, where V is the volume of the electrolytic or plating chamber (annular space S) in liters, in order to attain the above-described effects on the quality of the resulting plated coating. The maximum flow rate is not critical, but it is generally 4.0×V and preferably 3.0×V from the viewpoint of economy.

In both electroplating and electroless plating, the rotational pattern of the metal pipe may be unidirectional continuous rotation, unidirectional intermittent rotation, or repeated reverse rotation. Repeated reverse rotation is advantageous in that the hoses and cables connected to the metal pipe and electrode are prevented from twisting. However, such twisting can be prevented if rotary joints or similar means are used to connect these hoses and cables, and in such a case it is possible to employ unidirectional rotation.

In any rotational pattern, the rotational speed is preferably at least 2 rpm and more preferably at least 4 rpm. The maximum rotational speed is preferably 10 rpm and more preferably 8 rpm since a higher speed tends to make the rotation of the metal pipe unstable.

The difference or gap between the diameters of the opposing surfaces of the metal pipe and the electrode, i.e., between the inner diameter of the metal pipe 10 and the outer diameter of the internal electrode 30 or between the outer diameter of the metal pipe 10 and the inner diameter of the external electrode 70, is preferably at least 40 mm. A smaller gap may cause direct contact between the metal pipe and the electrode due to sagging, thereby producing a short circuit of the current for electroplating. In addition, the volume of the plating solution flowing or present in the plating chamber (annular space) becomes so small that gas evolved by the electrolytic reaction occupies a considerable part of the volume and makes the thickness of the plated coating uneven in the longitudinal direction of the pipe.

The above-described plating methods and apparatuses can be applied to plating of a long and/or heavy metal pipe having a length greater than 10 m and/or a weight greater than 1000 kg.

The following examples are presented to further illustrate the present invention. These examples are to be considered in all respects as illustrative and not restrictive.

EXAMPLES

EXAMPLE 1

Metal pipes made of a carbon steel, stainless steel, and Ni-base alloy having the compositions shown in Table 1 were used as inner or outer pipes. The dimensions of the inner pipe were 117 mm in outer diameter, 3 mm in wall thickness, and 4 m in length, while those of the outer pipe were 140 mm in outer diameter, 15 mm in wall thickness, and 3 m in length. The inner pipe was longer than the outer pipe because the outer pipe was expected to be extended to a larger degree than the inner pipe during cold working.

The combinations of the inner and outer pipes were as indicated in Table 2. In each combination, the metallic material of the inner pipe was more susceptible to the formation of a passive oxide film than that of the outer pipe. The opposing surfaces of the inner and outer pipes to be bonded to each other, i.e., the outside surface of the inner pipe and the inside surface of the outer pipe were polished by a grinder so as to adjust the surface roughness to an Rmax of 50 μm.

TABLE 1

| | Chemical Composition (wt %) | | | | | | | | | |
|---|---|---|---|---|---|---|---|---|---|---|
| | C | Si | Mn | P | S | Ni | Cr | Mo | Ti | Fe |
| Carbon steel | 0.09 | 0.21 | 1.05 | 0.008 | 0.002 | — | — | — | 0.01 | bal. |
| Stainless steel | 0.06 | 0.50 | 1.70 | 0.02 | 0.02 | 10.0 | 18.5 | — | 0.03 | bal. |
| Ni-base alloy | 0.02 | 0.25 | 0.68 | — | — | 43.5 | 22.4 | 3.2 | 0.3 | bal. |

TABLE 2

| Combination No. | Inner pipe | Outer pipe |
|---|---|---|
| (1) | Stainless steel | Carbon steel |
| (2) | Ni-base alloy | Carbon steel |
| (3) | Ni-base alloy | Stainless steel |

One surface of one of the pipes (shown in Table 3) was subjected to electroplating so as to form an Ni-B layer on that surface. The electroplating was carried out by the above-described electroplating methods and apparatuses. Namely, interior electroplating of the outer pipe was performed by the first electroplating method and apparatus, while exterior electroplating of the inner pipe was performed by the second electroplating method and apparatus.

The plating solution used in electroplating contained $NiSO_4$ (nickel sulfate), $NiCl_2$ (nickel chloride), $H_3BO_4$ (orthoboric acid), and $(CH_3)_3N \cdot BH_3$ (trimethylamine borane). Phosphoric acid was added to the plating solution when it was desired to form an Ni-B layer containing P, i.e., Ni-B-P layer. The composition and thickness (average thickness measured at several points) of the resulting Ni-B layer (shown in Table 3) were adjusted by varying the composition of the plating solution, current density, and duration of passage of an electric current.

The internal and external electrodes used in the electroplating were steel pipes made of SUS 304 stainless steel, which served as insoluble anodes.

The plating procedure consisted of degreasing, water rinsing, pickling, water rinsing, plating, and water rinsing. The degreasing was performed electrolytically for 2 minutes at a temperature of 60°–70° C. using an aqueous 3% sodium orthosilicate solution as a degreasing solution, while the pickling was performed for 1 minute at room temperature using The plating was performed at a an aqueous 10% HCl solution. temperature of about 50° C.

Each of the degreasing, pickling, and plating solutions was forced to flow unidirectionally at a speed of 2×V. The pipe to be plated and the electrode were rotated about their axes at 6 ppm with repeated reverse rotations having a rotational amplitude of 1.5 revolutions during the procedure.

The thickness of the resulting electroplated Ni-B layer was largest in the end areas and smallest in the central area. The variation in thickness of the plated layer along the longitudinal axis of the pipe was less than about 10%. The circumferential variation in thickness of the plated layer in the central area was about 2%. No bare spots or marks of bubbles were observed on the plated surface.

For comparison, the electroplating procedure was performed in the same manner as above except that the metal pipe and the electrode were not rotated during plating. The circumferential variation in thickness of the plated layer in the central area was as large as 20–30%. Such a large variation was found even if the plating solution was forced to flow at a speed increased by 50% (to 3×V). If the plating solution was not forced to flow, numerous fine marks of bubbles were observed on the plated surface.

The plated pipe and the other bare pipe were assembled by inserting the inner pipe into the outer pipe, and the assembled pipes were welded at one end. After the welded end was pointed, the assembled pipes were subjected to cold drawing to reduce the diameter and form raw clad pipe in which the two pipes were in contact.

The raw clad pipe was placed in a heating furnace and subjected to heat treatment in air to bond the inner and outer pipes by thermal diffusion. In some runs, the raw clad pipe was initially subjected to local heating by high-frequency induction heating while the heated zone was continuously and unidirectionally moved along the longitudinal axis of the pipe, before it was heat-treated as described above.

Both ends of the heat-treated pipe were cut off to produce the desired clad pipe product. The conditions for the cold drawing, local heating, and heat treatment for diffusion bonding are shown in Table 3.

The clad pipe obtained in each run was checked for voids in the bonded area and cracks formed due to such voids by a supersonic flaw detecting test along the entire length of the pipe. The test was performed with a pipe feed rate of 8 mm/rpm, nominal frequency of 5 MHz, and oscillator diameter of 10 mm. The test results are shown in Table 3.

In clad pipe for oil and gas wells and chemical plants, the result of a supersonic flaw detecting test is used as a criterion whether the two pipes are bonded with good adhesion. For example, the criterion under the above-described test conditions is that the total number of voids and cracks is 8 per meter or less along the entire length of the pipe.

As can be seen from Table 3, all the clad pipes produced in accordance with the present invention had no or a small number of voids and cracks and met the above-described criterion. It is noted that particularly good adhesion in diffusion bonding could be obtained by heat treatment at a relatively low temperature of 1070° C. when the Ni-B plated layer contained P, and by heat treatment for a relatively short period when the heat treatment was preceded by local heating.

TABLE 3

| Run No. | Combination No. | Plated Ni-B layer Composition (%) | | | | Thickness (μm) | Pipe Plated | % Reduction of inner pipe in cold working | Local Heating Temperature (°C.) | Moving speed (mm/s) | Heat treatment Temperature (°C.) | Duration (min) | Total No. of voids and cracks per meter |
|---|---|---|---|---|---|---|---|---|---|---|---|---|---|
| | | B | P | Ni | Fe | | | | | | | | |
| A 1 | (1) | 5 | — | bal. | 2 | 30 | Outer | 2 | — | — | 1100 | 30 | 0 |
| A 2 | (1) | 1 | — | bal. | 1 | 10 | Outer | 2 | — | — | 1100 | 30 | 1 |
| A 3 | (1) | 3 | 1 | bal. | 2 | 30 | Outer | 2 | — | — | 1070 | 30 | 0 |
| A 4 | (1) | 5 | — | bal. | 2 | 30 | Outer | 2 | 1150 | 1 | 1100 | 10 | 0 |
| A 5 | (2) | 5 | — | bal. | 2 | 30 | Outer | 2 | — | — | 1100 | 30 | 1 |
| A 6 | (2) | 1 | — | bal. | 1 | 10 | Outer | 2 | — | — | 1100 | 30 | 0 |
| A 7 | (2) | 3 | 1 | bal. | 2 | 30 | Outer | 2 | — | — | 1070 | 30 | 0 |
| A 8 | (2) | 5 | — | bal. | 2 | 30 | Outer | 2 | 1150 | 1 | 1100 | 10 | 0 |
| A 9 | (3) | 5 | — | bal. | 2 | 30 | Outer | 2 | — | — | 1100 | 30 | 6 |
| A 10 | (3) | 1 | — | bal. | 1 | 10 | Outer | 2 | — | — | 1100 | 30 | 7 |
| A 11 | (3) | 3 | 1 | bal. | 2 | 30 | Outer | 2 | — | — | 1070 | 30 | 5 |
| A 12 | (3) | 5 | — | bal. | 2 | 30 | Outer | 2 | 1150 | 1 | 1100 | 10 | 5 |
| B 1 | (1) | 5 | — | bal. | 2 | 30 | Outer | 0* | — | — | 1100 | 30 | 55 |
| B 2 | (2) | 5 | — | bal. | 2 | 30 | Outer | 15* | — | — | 1100 | 30 | 61 |
| B 3 | (3) | 5 | — | bal. | 2 | 30 | Outer | 2 | — | — | 1050* | 30 | 70 |

Runs Nos. A1–A12 are examples of this invention and Runs Nos. B1–3 are comparative examples.
*Outside the range defined in the present invention.

EXAMPLE 2

Clad pipes were produced in the same manner as described in Example 1 except that degreasing was performed without passing an electric current and that the Ni-B layer was formed by electroless plating in each run. The electroless plating apparatus used was the same as that-shown in FIG. 2 except that the internal electrode and power source were eliminated.

In this example, only Combination No. 2 shown in Table 2 was employed, that is, the inner and outer pipes were made of an Ni-base alloy and a carbon steel, respectively, each having the composition shown in Table 1 and the same dimensions as described in Example 1. The durations of degreasing and pickling were 5 minutes and 2 minute, respectively, under the same conditions as employed in Example 1 except that each solution was not forced to flow.

The plating solution used in electroless plating contained $NiSO_4$, $(CH_3)_2HN \cdot BH_3$ (dimethylamine borane), complexing agents (tartaric acid and benzoic acid), and optionally hypophosphorous acid, and had a pH of 5.0–6.0. A typical composition of the plating solution was 8 g/l as $Ni^{2+}$ of $NiSO_4$, 10 g/l of complexing agents, 6 g/l of dimethylamine borane, and 4 g/l of hypophosphorous acid. The electroplating was performed at a temperature of 65°–75° C. without a forced flow of the plating solution.

The composition and thickness of the plated Ni-B layer and the conditions for the cold drawing, local heating, and heat treatment for diffusion bonding in each run are shown in Table 4 along with the test results (voids and cracks detected by a supersonic flaw detecting test), in which "no" means that the total number of voids and cracks was 8 per meter or less along the entire length of the pipe while "yes" means that the total number of voids and cracks was more than 8 per meter.

Also when the Ni-B layer serving as an insert was formed by electroless plating, all the clad pipes produced in accordance with the present invention had no or a small number of voids and cracks and met the above-described criterion.

It will be appreciated by those skilled in the art that numerous variations and modifications may be made to the invention as described above with respect to specific embodiments without departing from the spirit or scope of the invention as broadly described.

TABLE 4

| Run No. | Combination No. | Plated Ni-B layer Composition (%) | | | | Thickness (μm) | Pipe Plated | % Reduction of inner pipe in cold working | Local Heating Temperature (°C.) | Moving speed (mm/s) | Heat treatment Temperature (°C.) | Duration (min) | Presence of detectable voids and cracks |
|---|---|---|---|---|---|---|---|---|---|---|---|---|---|
| | | B | P | Ni | Fe | | | | | | | | |
| A 1 | (2) | 5 | — | bal. | 2 | 30 | Outer | 2 | — | — | 1100 | 30 | No |
| A 2 | (2) | 5 | — | bal. | 1 | 10 | Outer | 2 | — | — | 1100 | 30 | No |
| A 3 | (2) | 3 | — | bal. | 2 | 30 | Outer | 2 | — | — | 1200 | 10 | No |
| A 4 | (2) | 5 | — | bal. | 2 | 30 | Outer | 1 | — | — | 1250 | 5 | No |
| A 5 | (2) | 5 | — | bal. | 2 | 30 | Outer | 6 | — | — | 1150 | 20 | No |
| A 6 | (2) | 5 | 3 | bal. | 3 | 25 | Outer | 2 | — | — | 1050 | 30 | No |
| A 7 | (2) | 3 | — | bal. | 2 | 30 | Outer | 0.7 | 1150 | 1 | 1100 | 3 | No |
| A 8 | (2) | 5 | — | bal. | 2 | 30 | Outer | 0.7 | 1200 | 6 | 1100 | 3 | No |
| A 9 | (2) | 5 | — | bal. | 18 | 30 | Outer | 1 | 1150 | 0.3 | 1100 | 3 | No |
| A 10 | (2) | 5 | — | bal. | 25 | 80 | Outer | 1 | 1250 | 0.3 | 1150 | 3 | No |
| A 11 | (2) | 6 | — | bal. | 2 | 80 | Outer | 3 | — | — | 1250 | 60 | No |
| B 1 | (2) | —* | — | bal. | 2 | 30 | Outer | 2 | — | — | 1100 | 30 | Yes |
| B 2 | (2) | —* | 10* | bal. | 1 | 30 | Outer | 2 | — | — | 1100 | 30 | Yes |

TABLE 4-continued

| | | Plated Ni-B layer | | | | | | % Reduction of inner pipe in cold working | Local Heating | | Heat treatment | | Presence of detectable voids and cracks |
|---|---|---|---|---|---|---|---|---|---|---|---|---|---|
| Run No. | Combination No. | Composition (%) | | | | Thickness (μm) | Pipe Plated | | Temperature (°C.) | Moving speed (mm/s) | Temperature (°C.) | Duration (min) | |
| | | B | P | Ni | Fe | | | | | | | | |
| B 3 | (2) | 5 | — | bal. | 2 | 0.5* | Outer | 2 | — | — | 1100 | 30 | Yes |
| B 4 | (2) | 5 | — | bal. | 2 | 30 | Outer | 0* | — | — | 1100 | 30 | Yes |
| B 5 | (2) | 5 | — | bal. | 2 | 30 | Outer | 20* | — | — | 1100 | 30 | Yes |
| B 6 | (2) | 5 | — | bal. | 2 | 25 | Outer | 2 | — | — | 1050* | 30 | Yes |

Runs Nos. A1–A11 are examples of this invention and Runs Nos. B1–6 are comparative examples.
*Outside the range defined in the present invention.

What is claimed is:

1. A process for manufacturing clad pipe having an inner pipe and an outer pipe metallurgically bonded to each other, comprising the steps of:

(a) preparing an inner pipe and outer pipe made of different metallic materials, the outer pipe having an inner diameter larger than the outer diameter of the inner pipe;

(b) forming an Ni-B layer by plating on the surface of one of the pipes facing the other pipe when the two pipes are assembled, the Ni-B layer having a thickness of 2–100 μm and consisting essentially, on a weight basis, of B: 0.5%–7%, Fe: 0%–30%, P: 0%–7%, and a balance of Ni and inevitable impurities;

(c) assembling the two pipes by inserting the inner pipe into the outer pipe;

(d) subjecting the assembled pipes to cold working for reduction in diameter to such a degree that the outer diameter of the inner pipe is reduced by from 0.5% to 10% to form raw clad pipe in which the inner and outer pipes are in contact; and (e) subjecting the raw clad pipe to heat treatment in the temperature range of 1050°–1250° C. for a time sufficient to metallurgically bond the inner and outer pipes by diffusion bonding.

2. The process of claim 1 wherein the Ni-B layer is formed on the pipe the material of which is either less susceptible to the formation of a passive oxide film than the material of the other pipe or unsusceptible to the formation of such a film.

3. The process of claim 1 wherein the Ni-B layer is substantially free from phosphorus and wherein the heat treatment in step (e) is conducted in the temperature range of 1100°–1250° C.

4. The process of claim 1 wherein the Ni-B layer contains 0.5%–7% by weight of phosphorus.

5. The process of claim 1 which further comprises the following step (f) between the cold working step (d) and the heat treatment step (e):

(f) heating the raw clad pipe locally to a temperature of 1050°–1250° C. while moving the heated zone continuously at a speed of 0.1–10 mm/sec along the longitudinal axis of the pipe from one end to the other end thereof.

6. The process of claim 1 wherein the Ni-B plated layer is formed by electroplating.

7. The process of claim 1 wherein the Ni-B plated layer is formed by electroless plating.

8. The process of claim 1 wherein the Ni-B plated layer is formed on the inside surface of the outer pipe.

9. The process of claim 8 wherein the formation of the Ni-B plated layer is performed by an electroplating method which comprises horizontally supporting the outer pipe, inserting a round bar- or pipe-shaped internal electrode concentrically into the outer pipe so as to leave an annular space between the outer pipe and the inserted internal electrode, the annular space extending along the entire length of the outer pipe, and performing electroplating of the inside surface of the outer pipe by passing an electric current between the outer pipe, functioning as a cathode, and the internal electrode, functioning as an anode, while a plating solution is forced to flow in the annular space unidirectionally from one end to the other end thereof and while the outer pipe is rotated about its axis.

10. The process of claim 8 wherein the formation of the Ni-B plated layer is performed by an electroless plating method which comprises horizontally supporting the outer pipe, and performing electroless plating of the inside surface of the outer pipe while the outer pipe is rotated about its axis.

11. The process of claim 1 wherein the Ni-B plated layer is formed on the outside surface of the inner pipe.

12. The process of claim 11 wherein the formation of the Ni-B plated layer is performed by an electroplating method which comprises horizontally supporting the inner pipe, placing a round pipe-shaped external electrode so as to surround concentrically the inner pipe and leave an annular space between the inner pipe and the surrounding external electrode, the annular space extending along the entire length of the inner pipe, and performing electroplating of the outside surface of the inner pipe by passing an electric current between the metal pipe, functioning as a cathode, and the external electrode, functioning as an anode, while a plating solution is forced to flow in the annular space unidirectionally from one end to the other end thereof and while the inner pipe is rotated about its axis.

13. The process of claim 11 wherein the formation of the Ni-B plated layer is performed by an electroless plating method which comprises inserting the inner pipe concentrically into a horizontally-supported cover pipe so as to leave an annular space between the inner pipe and the surrounding cover pipe, the annular space extending the entire length of the inner pipe, and performing electroless plating of the outside surface of the inner pipe while the inner pipe is rotated about its axis.

14. The process of claim 9 wherein the formation of the Ni-B plated layer on the inside surface of the outer pipe by electroplating is performed in an electroplating apparatus, which comprises:

a round bar- or pipe-shaped internal electrode inserted into a metal pipe to be plated so as to leave an annular space extending along the entire length of the metal pipe between the metal pipe and the inserted internal electrode, a pair of sealing lids secured to the opposite ends of the internal electrode, the sealing lids supporting the internal electrode concentrically with respect to the surrounding metal pipe and sealing the annular space between the metal pipe and the internal electrode, a rotating mechanism for supporting the metal pipe horizontally and rotating the pipe about its axis along with the internal electrode inserted therein, a power source for applying a potential between the internal electrode and metal pipe in such a manner that the metal pipe functions as a cathode and the electrode functions as an anode, and a fluid-feeding means for creating a forced unidirectional flow of a fluid in the annular space from one end to the other end thereof through the sealing lids.

15. The process of claim 12 wherein the formation of the Ni-B plated layer on the outside surface of the inner pipe by electroplating is performed in an electroplating apparatus, which comprises:

a round pipe-shaped external electrode surrounding a metal pipe to be plated so as to leave an annular space extending along the entire length of the metal pipe between the metal pipe and the surrounding external electrode, a pair of sealing lids secured to the opposite ends of the external electrode, the sealing lids supporting the metal pipe concentrically with respect to the surrounding external electrode and sealing the annular space between the metal pipe and the external electrode, a rotating mechanism for supporting the external electrode horizontally and rotating the electrode about its axis along with the metal pipe placed therein, a power source for applying a potential between the external electrode and metal pipe in such a manner that the metal pipe functions as a cathode and the electrode functions as an anode, and a fluid-feeding means for creating a forced unidirectional flow of a fluid in the annular space from one end to the other end thereof through the sealing lids.

16. The process of claim 1 wherein the Ni-B layer contains 1% to 4% by weight of B.

17. The process of claim 4 wherein the Ni-B layer contains from 1% to 4% by weight of P.

18. The process of claim 1 wherein the Ni-B layer has an Fe content of up to 20% by weight.

19. The process of claim 3 wherein the heat treatment is conducted in the temperature range of 1150°–1250° C.

20. The process of claim 4 wherein the heat treatment is conducted in the temperature range of 1100°–1250° C.

21. The process of claim 1 wherein the outer pipe is made of a metallic material selected from the group consisting of a carbon steel, low-alloy steel, and stainless steel and the inner pipe is made of a metallic material selected from the group consisting of a stainless steel and corrosion-resistant alloy.

22. The process of claim 19 wherein the Ni-B layer is formed on the inside surface of the outer pipe.

23. The process of claim 1 wherein the cold working is performed to such a degree that the outer diameter of the inner pipe is reduced by 2% to 10%.

24. The process of claim 5 wherein the width of the heated zone is in the range of about 20 mm to about 30 mm.

* * * * *